HIGH SPEED RECORDING DEVICE
Filed July 21, 1959 5 Sheets-Sheet 1
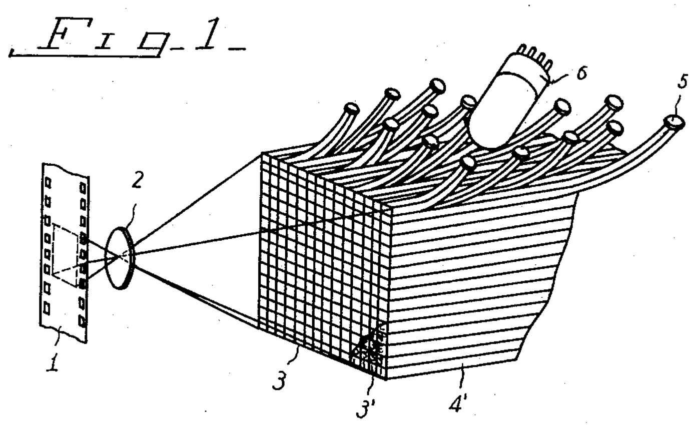
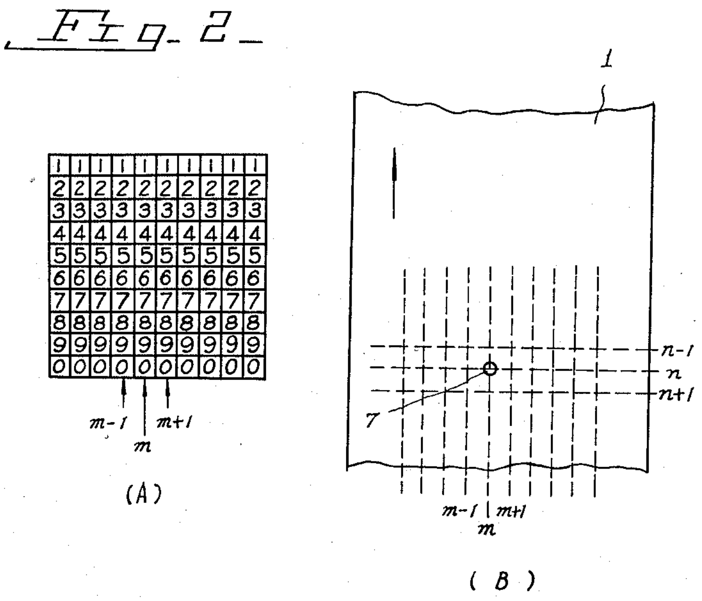

3,116,963

HIGH SPEED RECORDING DEVICE

Zen-iti Kiyasu, 1551 Kichijoji, Musashino-shi, Sanae Amada, 46 Jiyugaoka, Meguro-ku, and Tomohiko Hayashi, 2729 Noguchi, Higashimurayama-machi, Kitatama-gun, all of Tokyo, Japan Filed July 21, 1959, Ser. No. 828,480
Claims priority, application Japan July 21, 1958
3 Claims. (Cl. 346—107)

This invention relates to improvements for a high speed recording device.

While operating speeds of high speed calculating mechanisms in an electronic computer have increased, due to the remarkable development of electronic engineering techniques, the operating speeds of an output device heretofore presented a limitation to the speed of electronic computers because the operating speed of output devices had much slower speeds than the electronic computer. It is among the objects of the invention to provide an extremely high speed recording device which corresponds to the increased speed of electronic computers.

The characteristic features of the device according to this invention are: employment of an optical recording system in order to increase the operating speed of the device, employment of mechanical systems designed to provide non-intermittent movement, employment of electronic control operations, the circuit elements of said control operations being provided by the superposition of relatively simple circuits whereby though the operating speed of the device becomes extremely high, the maintenance of the device is very simple.

In a device of the above type, the recording of information is made on highly photo-sensitive material such as a photographic film, preferably taken from a storage spool at a constant speed and fed to a take-off spool after having passed through the recording zone. Furthermore, it is preferable to make the recordings in several lines perpendicular to the direction of the movement of the photo-sensitive material.

In a mechanical high speed printer used in an output device of an electronic computer an extremely high printing output is required. In such printers used heretofore a plurality of printing mechanisms, the number of which is the same as the maximum number of characters to be printed, are placed laterally in one line, and the printing of one line effected in one operation of the printing mechanism. However, the operating period of printing mechanisms cannot be decreased nor the number of characters in a line increased indefinitely and thus this type of high speed printer is inevitably limited. Thus the common printing speed of this type printer is of the order of a few thousand to ten thousand characters per minute.

The device according to Japanese patent application No. 23682/57 (corresponding to U.S. Serial No. 763,015, filed on September 24, 1958) entitled "A High Speed Printing System" invented by Sanae Amada and assigned to applicants of this application, now Patent No. 3,012,499, discloses a system in which groups of printing types are caused to move laterally against a printing paper, the groups of printing types and the type hammers being arranged in N overlapped positions longitudinally. By employing such a system it is possible to increase the printing operation in one operation of the printer by N lines respectively, and the number of characters printed in every minute can be multiplied by N. But in the construction shown in said patent application, N is ordinarily 2, and at best N can only reach 3 or 4.

The above values are limited, because the printing motive face is supplied directly from electro-magnets, and the dimensions of electro-magnets cannot be decreased beyond certain limits. Though the type hammers could be mounted with pitches corresponding to the spacings of figures (in a lateral direction) and to the spacings of lines (in a longitudinal direction), it is difficult to couple the electro-magnets and hammers effectively and uniformly.

The principal object of the present invention is to provide a high speed recording device which obviates the above disadvantages in the mechanical printer by means of an ingenious utilization of a photographic technique.

The invention is diagrammatically illustrated by way of example in the accompanying drawings, in which:

FIGURE 1 shows a graphic representation of the main recording portion of a high speed recording device according to the invention;

FIGURES 2A and 2B illustrate the recording method according to the invention;

Figure 3:
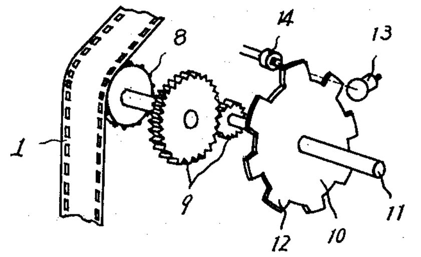
FIGURE 3 shows an example of a control pulse generating mechanism for recording.

In FIG. 1, which shows diagrammatically a representation of the main recording portion in a high speed printing device according to this invention: 1 is a photo-sensitive element such as a photographic film, 2 is a collective lens such as a photographic lens, 3 is an original plate or mother plate for letters or other characters. The mother plate is similar to the mother plate used in photographic typesetting and is preferably composed of letters or characters printed in white on a black background and arranged in matrix type in lateral and longitudinal directions as shown in portion 3'.

The arrangement of the required figures in this mother plate 3 is determined in the following manner:

The number of figures in a lateral line is determined by the numbers of figures in a line on the photo-sensitive element 1, the numbers of figures in a longitudinal row being determined by the letters or figures to be produced in the device. Moreover, it is advantageous for control purposes to arrange the same letter or character in a lateral line, but any special row may have different letters or characters on the recording surface. For example, when the numbers of characters or letters in a line is 50 and the kind of indicia is for example 48 in number and comprising letters of the alphabet, digits and other characters, the arrangement of characters is a matrix $50 \times 48$, and every lateral line is of the same character. However, any longitudinal row has 48 indicia, such as A. B. C. . . . when a specific row is required to record said letters only.

In FIG. 1, 4 is a bundle of light guide bars comprising rectangular or circular light guiding bars made of transparent and refractive material. It is known that a substantial part of the light impinging on one end of a bar can be transmitted to the other end. The bundle 4 of guide bars is composed of a plurality of guide bars, the number corresponding to the number of figures or letters on the mother plate 3, one end of said guide bars being arranged to illuminate the figures on the mother plate 3 and the other ends being each provided with light collecting lenses 5. These light collecting lenses 5 operate to cause the light from discharge tubes 6 to impinge upon the corresponding guide bars.

When discharge tubes 6, having a large illuminating power, sufficient high recurrent illuminating speed, and sufficiently small dimensions are obtained, the guide bar bundle 4 in FIG. 1 may be dispensed with because it is sufficient in such a case to arrange respective discharge tubes adjacent the mother plate 3. But as the size of the figures upon the mother plate 3 is generally between about 6–20 millimeters and the diameters of discharge tubes having a large illuminating power and short recurrent illuminating period as presently obtainable are of the order of 20 to 40 millimeters, it is necessary to use a bundle of light guiding bars to connect the mother plate and discharge tubes and to collect said light at the surface of the area of the mother plate.

When one discharge tube 6, such as shown in FIG. 1, is illuminated, the light is collected by a guide bar 4 corresponding to the illuminated discharge tube by a lens 5, and one letter or character on the mother plate 3 is illuminated by the light emitted from the other end of a guide bar 4. This figure is directed onto a photo-sensitive material 1 by a collective lens 2.

FIG. 2 shows diagrammatically the method of recording according to the invention, in which FIG. 2A shows a mother plate and FIG. 2B shows a portion of the photo-sensitive element. In these figures, the number of characters or letters on the mother plate is decreased for exemplary purposes to a matrix of 10×10, but the principle of operation for a greater number of characters or letters as in the example mentioned above, is the same. In FIGS. 2A and 2B, the photo-sensitive element 1 is moving upwardly in the direction shown by the arrow. The characters or letters on the *m*th row on the photo-sensitive material, are recorded on the material by the light passing through the mother characters or letters on the *m*th row of the original plate 3.

Consider, for example, a point 7 on the photo-sensitive element in a line such as the *n*th line and in a suitable row such as the *m*th row. If, for example, this point 7 is arranged to move upwardly to a position corresponding to mother characters or letters on the *m*th row on the original plate, when a digit "0" is to be recorded on this point 7, then it is sufficient that the discharge tube 6 be illuminated for a short period when the point 7 reaches the lowermost stage of the *m*th row of the original plate 3 (the arrangement of the mother letters are assumed as shown in FIG. 2A). As a further example when it is required to record at point 7 a digit "6," it is sufficient to illuminate the discharge tube 6 coupled to the *m*th row and line "6" at the instant when said point 7 reaches a height of 5 lines from the base, passing through corresponding positions on the *m*th row and line. Recording at the other points in the photo-sensitive element is carried out in the same manner as described above and independently of one another. Accordingly, recording is effected when the point to be recorded is passing over the projected image on the mother plate. The recording of a character or letter at a specific position on the photo-sensitive element is determined by, for example, an electronic computer or the like acting to furnish signals to this device, and the mechanism to control the suitable discharge tube is described hereinafter.

There are two principal methods of controlling the discharge tube. One is to receive a clock pulse from an electronic computer supplying signals to the device in order to control the discharge tube and simultaneously feed the photo-sensitive material with said pulse. Another is to incorporate with the device a constant speed motor having a suitable speed to feed the photo-sensitive element and to generate a control pulse only to control the discharge tube. As the constructions of the control mechanisms are similar, only the method according to the latter construction will be shown.

FIG. 3 shows a control pulse generating mechanism, in which 1 is again the photo-sensitive recording element, 8 is a sprocket wheel or feed roll to feed said elements, 9 is a suitable transmission device, 10 is a signal disc provided upon a constant speed rotating shaft 11, projections 12 having suitable width as shown being provided on the signal disc. The pitch of these projections 12 is determined as follows: when the photo-sensitive element 1 feeds a line spacing as, for example, the line spacing of the original plate 3 (FIG. 1) by lens 2 upon the photo-sensitive element 1, the signal disc 10 is arranged to move the projection 12 through one pitch only.

Figure 4:
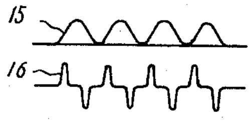
FIGURE 4 shows a signal wave form and the modification thereof obtained by the control pulse generating mechanism shown in FIG. 3.

When a light source 13 and a photo-electric element 14, such as a photo-transistor, are provided on each side of the projection 12 as shown, the output of the photo-electric element 14 has the wave form 15 as shown in FIG. 4, and the period of said wave form is the same as the time in which the photo-sensitive element 1 is moved by an amount corresponding to one line spacing. The wave form shown, 15, can readily be transformed into wave form 16 by a differentiation circuit. In this mechanism, a read-in operation of signals into a register circuit described hereinafter is carried out by the positive pulses of the differentiated wave form 16 and the shift operation of the marks within the register circuit is carried out by the negative pulses of said differentiated wave form.

Figure 5:
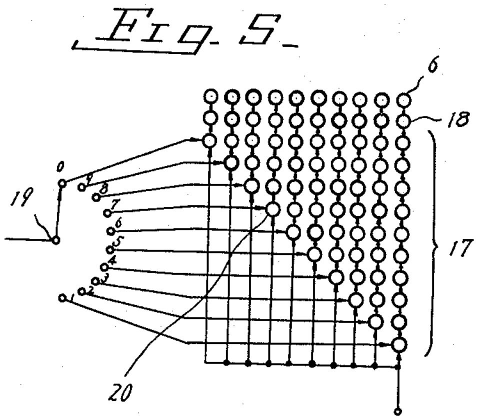
FIGURE 5 is an example of a control circuit for recording.

FIG. 5 shows one example of a record control circuit wherein ten characters are used as in the example shown in FIG. 2. The control circuit for only one row is shown. For a device having mother characters 10×10, as shown in FIG. 2, 10 groups of circuits as shown in FIG. 5 are required.

The main portion of the control mechanism comprises shift registers 17 arranged in a trigonal formation. The lowermost shift registers 17 in each longitudinal row have the read-in function for the marks, and each of the shift registers 17 is adapted, on receiving the said read-in marks, to shift them upwardly one by one. The outputs of the uppermost registers are respectively conducted to separate discharge tubes 6 through amplifying stages 18. The positive pulses in the wave form 16 in FIG. 4 are the pulses for recording the read-in function, and when one of these pulses reaches one of the registers 17, a marking signal is read-in into the lowermost register corresponding to the figure or letter to be read-in. (Which figure or letter to be read-in is determined by an electronic computer or the like, as stated previously; the function of said computer is shown by a switch 19 in FIG. 5.) If, for example, the figure or letter is the digit "7," the marking signal is read-in in the lowermost register 20 on the fourth row from left. As the negative pulses in curve 16 of FIG. 4 are the shift pulses, their arrival at the registers 17 shifts the mark signals to the next higher stage of the register, and the next read-in pulses act to read-in the signals in the next line. In this way, read-in mark signals are moved gradually into the upper lines, finally reaching amplifying stages 18 to illuminate the respective separate discharge tubes 6. The operation of these processes will be described with reference to FIG. 6.

FIGS. 6A–6E show register circuits corresponding to a recording row in which the number of characters or letters is reduced to 5 kinds for convenience of description. Suitable time intervals are provided to allow the figure to proceed from FIG. 6A to 6E. The recording on a certain row of "3, 4, 2, 5, 1" is described by way of example. At first, in FIG. 6A, when a read-in pulse is received to record "3," the lowermost register corresponding to row "3" is operated to read-in a mark. Then a shift pulse is received, the stored mark signal is shifted to an upper stage, and the next read-in pulse acts to read-in a mark at the lowermost register corresponding to "4." These conditions are shown in FIG. 6B. Then, a following shift pulse and a read-in pulse are received, and the conditions after receiving said pulses are shown in FIG. 6C. Similar conditions are shown successively in FIGS. 6D and 6E. The indications as shown in (3) (4) are to represent the conditions in which the discharge tubes corresponding to "3" and "4" are illuminated. A position of a row seen at present is expressed by X, and said row is moved in rightward direction one position by one position simultaneously with the shift function, representing "3" is recorded. In the next line, "4" is recorded, and in one separated line, "5" is recorded. In this one separated line, "2" is recorded two steps after FIG. 6E. Therefore, "3, 4, 2, 5, 1" are recorded in this line.

As seen from the above description, a figure or letter in a certain row on a certain line can be recorded when light passes through the original plate 3, said recording being limited to the one only, and the position of it cannot be interchanged. All of the recording rows are recorded independently and parallel with each other in the same manner as described above during the desired line (for example, such as a line denoted at X in FIG. 6) on the photo-sensitive element while the desired line is passing over the projection surface of the mother plate.

Summarizing, the operation of the device may be stated in simplified manner as follows:

There is provided a matrix consisting of a number of horizontal lines and a number of vertical rows. Each line of the matrix is constituted by the same numeral. A medium 1 is positioned with respect to the matrix such that upon illumination of a numeral in the matrix, a corresponding printing of said numeral on the medium will be produced. Printing on the medium is by successive horizontal lines in synchronization. As the medium moves vertically, there is recorded thereon numerals from the numerals in the matrix. Each vertical row of the matrix is independent of and separate from the other vertical rows. However, the vertical rows on the medium are concurrently recorded to produce horizontal lines of numerals. Thus, if only a single row of vertical numerals existed in the matrix, then only a single row will be printed on the printing medium and if a plurality of vertical rows existed in the matrix, then the same plurality of vertical rows will be printed on the medium concurrently and simultaneously. The recording of the vertical rows takes place simultaneously and corresponds to the independent concurrent recording of the vertical rows separately.

Figure 6:
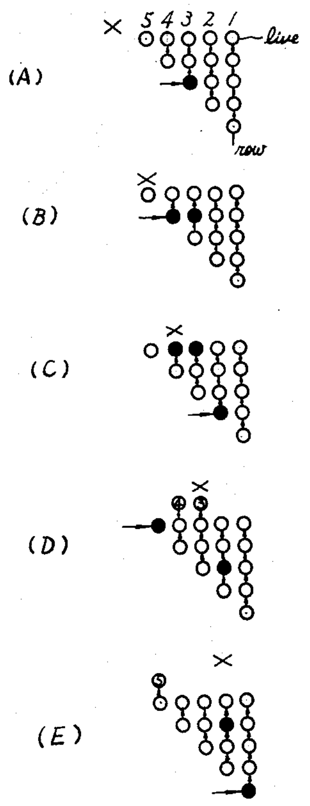
FIGURES 6A, 6B, 6C, 6D and 6E are diagrams showing the operation of the control circuit shown in FIG. 5.

As an example, the following operation is to be considered. Suppose the top line to be recorded on the medium was to be constituted of all 9's. Then, when the top line of the medium is positioned with respect to the line of the matrix corresponding to numeral 9, then all of the rows of the matrix along the 9 line would simultaneously be illuminated, thereby printing the subject line on the medium with all 9's. If, for example, the first row of the subject line were to be an 8 instead of a 9, then the matrix would be illuminated in all rows with the exception of the first row when the subject line is positioned with respect to the line of the matrix corresponding to the numeral 9. Thereafter, when the medium 1 is moved vertically with respect to the matrix to a position corresponding to numeral 8 thereon, the numeral 8 in the first row only would be illuminated to complete the line on the medium. It is to be understood that the pulse for illuminating numeral 8 would be deferred in a manner as shown in FIG. 6 until the medium assumed the position relative to the matrix for illumination of the numeral. By virtue of the above, any number of rows of numerals may be printed simultaneously on the same line of a recording medium.

As a further example, assume that four rows existed in the matrix and that the line to be printed is 4 2 1 3. When the line in question of the medium is arranged for printing relative to the 4 line of the matrix, then the first row of the 4 line is illuminated to print the 4 on the subject line in the first row. When the medium moves vertically to a position corresponding to the 3 line, then the 3 on the fourth row of the 3 line is illuminated to print the 3. At the next position of the subject line on the medium corresponding to the 2 line of the matrix, the 2 of the second row is illuminated to print the 2 on the subject line and finally, when the line is positioned relative to the 1 line on the matrix, the 1 in the third row of the matrix is illuminated, thereby completing the printing of the line on the medium. The original number (4 2 1 3) is fed to a shift register wherein the 4 is fed without delay to the discharge tube associated therewith, the 2 has two delays since the medium must move twice before it is aligned with the 2 line of the matrix for printing. Similarly, the 1 has three delays and 3 has one delay. For a more comprehensive discussion of how the delays are achieved, reference is had to the explanation of the register of FIG. 6.

A further point is to be made to fully explore the above situation and show completely the operation of the device. Suppose that the numeral in the fourth row in the line beneath 4 2 1 3 was a 4, i.e., beneath the 3, then it should be apparent that the 3 in the line 4 2 1 3 and the 4 in the same row and the line therebeneath would be printed simultaneously since the recording medium would be positioned relative to the 3 and 4 lines of the matrix for the above printing in only a single position.

It will be understood from above, that information can be recorded at high speed, the limits of said speed being mainly determined by two conditions. The first condition is represented by the total photo-sensitivity which is determined by the brightness of the discharge tube, the sensitivity of photo-sensitive element, the power of the lens, the compression ratio in size of the original plate and the photo-sensitive material, and so on. The second of the conditions is determined by the discharge time for a signal and discharge period in the discharge tube. These values depend upon the characteristics of the discharge tube itself. If, for example, the discharge time for a signal is 100 micro-seconds, and the first of the conditions is satisfied, in these recording systems, if the shortest discharge period is assumed to be fifty times greater than said discharge time, the slip of the figure or letter on the photo-sensitive film is not considered of practical effect and therefore the shortest discharge period can be 5 milli-seconds.

As stated above, since the shortest discharge period and the time necessary for feeding the photo-sensitive element for spacing of recording lines can be equal, the device according to the invention can record a line every 5 milli-seconds. When the number of the figures or letters constituting a line is 50, then 50 letters or figures can be recorded in every 5 milli-seconds, and therefore, the capacity of this device becomes 10,000 letters recorded in every second, and 600,000 letters recorded in every minute, which is better than the usual high speed printers.

Figure 7:
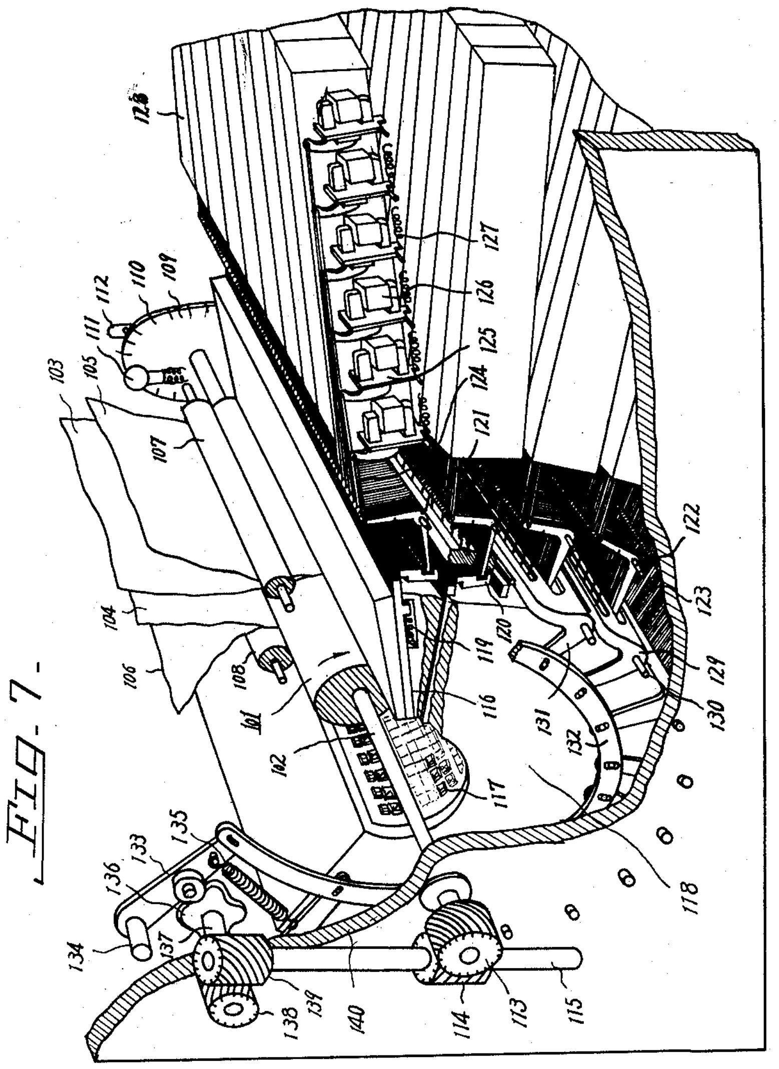
FIGURE 7 is a perspective view of a modification of the construction according to the invention.

A modification of the invention employing printing paper is shown in FIG. 7, in which 101 is a platen, 102 is its rotating shaft, 103 is a printing paper, 104 is a printed paper, 105 is a carbon paper, 106 is used carbon paper, 107 and 108 are press rollers which act to intimately press said paper 103 and 104 and carbon paper 105 and 106 to the platen 101, 109 is a signal disc having selection means to correspond with the maximum number of figures or letters printed in one line, the pitch of the type being selected to correspond to the spacings of the printed type. The relation between the paper 103, and carbon paper 105, can be made photo-sensitive. In this case, type bars and type hammers are modified to be operated photo-electrically.

The type 177 in the vertical surface relative to the rotating shaft are arranged in such manner that the spacing between adjacent characters is equivalent to the spacings between the lines when the type bars 116 are pressed inwardly and the type makes contact with the surface of the printing paper 103. The type bars are selected to correspond with the number of kinds of characters or letters included in this printing device. Thus when the number of kinds of letters used in this device is 15 including symbols and digits, the number of type bars in this direction is 15. When only letters of the alphabet are to be printed, 26 type bars are required. In the example described both characters or letters are used.

Elements 120 are selector fingers, each of which is arranged to correspond with its respective type signal disc to take out the synchronous signals mounted upon said shaft 102; 110 are slits upon said disc 109, 111 and 112 are respectively a light source and a photo-electric element such as a photo-transistor, synchronous signals being taken out by means of these elements and the signal disc 109. 113 is a gear mounted upon the extension of the shaft 102, 114 is also a gear meshing with said gear 113 and mounted upon a drive shaft 115 connected to an electric motor (not shown) through a suitable clutch mechanism. 116 are type bars, one end of which supports a type 117 the surface of type 117 being arranged on a concentric cylindrical surface around the platen 101, and supported by a guide block 118 to maintain a uniform spaced relation with the platen 101. In this example, the type bars 115 are held so that they can freely slide in the longitudinal direction. 119 are return springs for type bars 116. It is preferable that the arrangement of type 117 is such that the same characters or letters are sited in the same direction as the generating lines of the concentric cylinder. The number of type is the same as the number of bars 116, and each selector finger 120 is associated with an L type lever 121. When an L type lever rotates in clockwise direction, the end of a selector finger 120 slides into the outside of the outer end of type bar 116, and when the L type lever rotates in a counterclockwise direction, the end of the selector finger 120 will be separated from the outer end of type bar 116. This method is similar to the mechanism used in perforators or the like in teleprinters. 122 is the rotating shaft of L type lever 121 and 123 are return springs for the L type levers 121. 124 are link mechanisms comprising piano wires or the like to connect the L type levers 121 and armatures 125. 126 are electromagnets to receive electrical signals from the electronic computer (not shown), 127 are return springs for armatures 125, and 128 are magnet units comprising a magnet assembly shown by 25 to 27.

129 are type hammers adapted to support said selector fingers 120 and give the same suitable sliding movement, and are disposed longitudinally in parallel with the shaft of platen 101. These hammers 129 can turn upon axes 130 provided on the lines connecting the coupling points of selector fingers 120 and L type levers 121 in the direction of the shaft of platen 101.

When a type hammer 129 rotates upon axis 130, a corresponding selector finger 120 turns with a hammer 129 about the coupling point of the L type lever 121, and the relation between the several elements are similar to the perforator mechanism generally used in the teleprinters. Since arms 131 are provided upon the type hammers and the number of type hammers correspond to the number of type in perpendicular direction to the generatrix of the printing cylinder, the arms are connected by a ring link member 132. When the ring link member 132 moves in a clockwise direction, the type hammers 129 rotate simultaneously in a counterclockwise direction. 133 is a cam lever adapted to move the ring link 132, and 134 is a rotating shaft for said cam lever. 135 is a return spring for the cam lever 133 and ring link 132, 136 is a cam for actuating the cam lever 133, and 137 is a rotating shaft for the cam 136, having a gear 138 on its extension. The gear 138 meshes with a gear 139 mounted upon the shaft 115, which rotates cam 136 together with the rotation of the drive shaft 115. 140 is a side frame on one side of the device.

Figure 8:
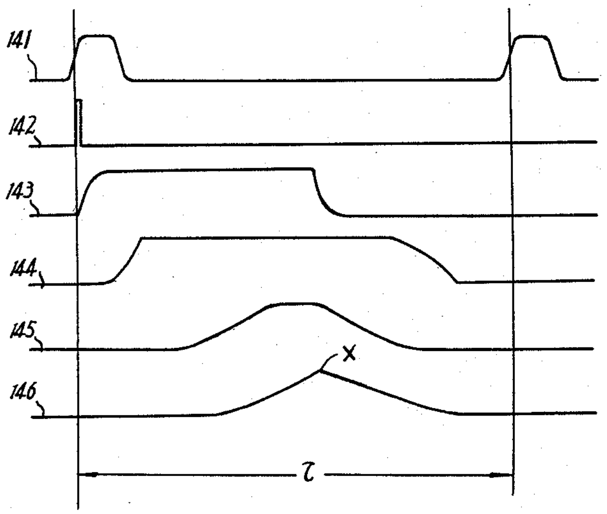
FIGURE 8 is an operating time chart of the mechanism shown in FIG. 7.

FIG. 8 shows an example of time chart of a high speed printing device according to the invention, in which $\tau$ represents an operating period for the device. 141 is a synchronous signal generated by a photo-electric element 112, and 142 is a printing signal pulse sent from an electronic computer for one type in the device by the action of the synchronous signal. This signal pulse 142 is modified in a suitable electronic circuit and supplied to a magnet 126 and 143 shows the wave form of a signal passing through the magnet 126. 144 is a wave form showing the operation of armature 125 and thus of a selector finger 120. 145 shows the operation of a cam lever 133, and therefore of a type hammer 129. 146 shows the operation of type bar 116 when the corresponding type finger 120 takes a mark position, and printing is effected at the point represented by X. The operation of this device has been described with reference to FIG. 2, but the operation will now be described in greater detail.

The printing paper 103 and a carbon paper 105 are rotated in the direction of the arrow, FIG. 7, in close contact with the platen 101. The operating period shown by $\tau$ in FIG. 8 corresponds to the period that the paper 103 on the platen 101 rotates for a line spacing. The slits 110 on the signal disc 109 are made according to the pitch between lines, the synchronous signals generated in a photo-electric element 112 also being generated with periods $\tau$, as shown in FIG. 8.

Whether specific type is to be printed or not in a printing period is determined by information stored in a storing circuit provided in an electronic computer. If the type is to be printed in said printing period, a printing signal pulse 142 is generated synchronous with the synchronous signal pulse 41. The generated synchronous signal pulse is modified to a desired wave form in a suitable electronic circuit, and thereafter supplied to a corresponding magnet 126. Thus a current is passed through the magnet 126, and the armature 125 is attracted as shown in 144, FIG. 2. The operation of the armature slips the top recessed end of a selector finger 120 into the outside end of the type bar 116 through a link mechanism 124 and L type 121.

When the printing signal pulse is not given, the magnet 126 does not attract the armature 125, and therefore the top recessed end of a selector finger 120 is, by the action of spring 123, separated from the outside end of a type bar 116. Just after the operation of a selector finger 120 is finished, cam lever 133 rotates in a counterclockwise direction, due to the action of cam 136. Thereby the ring link 132 rotates in a clockwise direction, and each type hammer 129 is simultaneously rotated in counterclockwise direction. In such conditions, that is to say when the selector finger 120 has been moved by the application of a signal pulse and is associated with the outside end of a type bar 116, the type bar is pressed towards the inside with the action of the type hammer 129.

When the selector finger 120 is not moved due to no application of the synchronous signal pulse the top end of said selector finger cannot engage with the outside end of the type bar 116, type cannot operate and a type hammer 129 is operated. The type hammer 129 is restored to position by the action of spring 135 after being rotated, but a type bar 116 once operated continues to operate due to the action of inertia, and the surface of type 117 impinges upon the platen 101 through a carbon paper 5 and a printing paper 3, and printing is effected.

Just after the type impinges on platen 101 the type bar 116 is restored by the reaction of platen 101 and the action of the spring 119. These movements are performed when the platen is rotating, and as it is not necessary to stop it at the printing stage the device can operate in high speed.

For the storing circuit in an electronic computer, which acts as a signal source, a construction having independent shift registers for each row of print shown in the former example can be used.

As seen from the foregoing, this modification has the advantage that printing is accomplished when the printing paper is constantly fed, printing for a line can be made at the time when a special position on the paper passes through the total arrangement of the type, and it is not necessary to spend time in selecting letters or figures since the whole information to be recorded is reproduced.

What is claimed is:

1. A high speed recording device for recording an output signal from an electronic computer, said device comprising: means for moving a light sensitive medium along a determinable path at a determinable speed, a stationary mother plate comprising a matrix of characters, illuminating means for selectively illuminating the characters of the matrix in a sequence in accordance with said output signal from said computer and in synchronization with the speed of the light sensitive medium, means for directing images of the illuminated characters in the path of said medium whereby recording of the desired character is effected on the light sensitive medium in a predetermined position thereon, a light source, a photosensitive element adjacent said light source and energizable thereby to produce a signal, means coupled to the first said means for periodically decoupling the photosensitive element and the light source during advancement of the light sensitive medium, and means coupled to said photosensitive elements and said electronic computer to receive signals from said computer and photosensitive element, the last said means being coupled to the illuminating means to furnish output signals thereto, said illuminating means illuminating the characters of the matrix in accordance with the last said signals.

2. A device as claimed in claim 1 wherein said matrix of characters are aligned respectively according to the number of characters to be recorded in a line and according to the different types of characters to be recorded.

3. A device as claimed in claim 1 wherein the means for periodically decoupling the photosensitive element and the light source comprises a rotatable element.

References Cited in the file of this patent

UNITED STATES PATENTS

| | | |
|---|---|---|
| 1,751,584 | Hansell | Mar. 25, 1930 |
| 2,596,741 | Tyler et al. | May 13, 1952 |
| 2,714,841 | Demer et al. | Aug. 9, 1955 |
| 2,736,770 | McNaney | Feb. 28, 1956 |
| 2,807,663 | Young | Sept. 24, 1957 |
| 2,874,634 | Hense | Feb. 24, 1959 |
| 2,881,976 | Greanias | Apr. 14, 1959 |
| 2,898,176 | McNaney | Aug. 4, 1959 |
| 2,909,973 | Koelsch et al. | Oct. 27, 1959 |

FOREIGN PATENTS

| | | |
|---|---|---|
| 671,660 | Great Britain | May 7, 1952 |